United States Patent [19]

Grey et al.

[11] Patent Number: 5,788,890
[45] Date of Patent: Aug. 4, 1998

[54] INJECTION MOLDING PROCESS

[75] Inventors: Ronald L. Grey, New Castle, Del.; Prosper Zufferey, Bernex, Switzerland

[73] Assignee: E. I. du Pont de Nemours and Company, Wilmington, Del.

[21] Appl. No.: 829,884

[22] Filed: Apr. 2, 1997

Related U.S. Application Data

[60] Provisional application No. 60/014,808 Apr. 4, 1996.

[51] Int. Cl.⁶ ............................ B29C 39/12; B29C 41/22
[52] U.S. Cl. .................................... 264/73; 264/245
[58] Field of Search ................................ 264/73, 245

[56] References Cited

U.S. PATENT DOCUMENTS

| | | | |
|---|---|---|---|
| 4,125,582 | 11/1978 | Langlois | 264/73 |
| 4,183,673 | 1/1980 | Easley et al. | 366/76 |
| 5,595,799 | 1/1997 | Beck et al. | 428/35.7 |

FOREIGN PATENT DOCUMENTS

| | | | |
|---|---|---|---|
| 58-055234 | 4/1983 | Japan | B29F 1/12 |
| 58-108251 | 6/1983 | Japan | C08L 77/00 |
| 60-000913 | 1/1985 | Japan | B29C 45/16 |

*Primary Examiner*—Jan H. Silbaugh
*Assistant Examiner*—Suzanne E. Mason
*Attorney, Agent, or Firm*—Craig H. Evans

[57] ABSTRACT

A process for making injection molded articles particularly ones having swirl patterns of polyamide in an ionomer (marble effect) employing a reciprocating screw injection molding machine is provided. The process involves making a nylon/colorant master batch and using a reciprocating screw injection machine to mold the nylon/colorant master batch and an ionomer under conditions that maintain the nylon/colorant master batch in a state wherein it will flow but will have a viscosity greater than the ionomer so that it will not disperse well in the ionomer at the temperature of injection molding.

4 Claims, No Drawings

INJECTION MOLDING PROCESS

This application claims the benefit of U.S. Provisional application Ser. No. 60/014,808, filed Apr. 4, 1996.

FIELD OF THE INVENTION

This invention relates to a process for creating a injection molded articles particularly ones having swirl patterns of polyamide in an ionomer (marble effect) employing a reciprocating screw injection molding machine. Such articles have particular utility in designer containers for cosmetics, caps for perfume bottles, and other decorative items.

BACKGROUND OF THE INVENTION

Use of ionomers such as SURLYN® ionomer available from E. I. du Pont de Nemours and Company, for making a wide variety of molded parts is well known. Such molded parts generally are uniform in color. Some variations in color can be obtained using plunger-type molding machines. In this type machine, the plastic pellets are delivered into the machine hopper from which they are volumetrically dropped into the heated cylinder while the ram is retracted. At the beginning of the injection cycle, the ram pushes rapidly forward and forces the resin into the cylinder, compacting it tightly behind and around the centrally located plasticizing torpedo or spreader. Fins center the torpedo and transfer heat to it from the cylinder walls. Heat and pressure join in plasticizing the resin. As the melt moves forward into the injection chamber of the cylinder, it reaches the required temperature and fluidity for injection through the cylinder nozzle into the mold cavity by the sustained forward motion of the plunger.

The properties of certain ionomers, particularly optical clarity, have established the ionomers as the material of choice in the European Cosmetic Industry for making perfume bottle caps, mostly in a clear or transparent color state, for women fragrances. There is a growing demand from perfume companies & their designers, for other looks. One such look that is desired is a swirled pattern, that is diffusive coloration with colored veins, ("marble effect").

Another desired appearance is that in which colored swirls appear as floating in a clear or tinted outer material ("cats eye glass marble effect").

Achieving such non-uniform colorations employing standard reciprocating screw injection molding machines is desired. In a reciprocating-screw injection molding machine, a rotating screw, similar to those used in extruders replaces the plunger. Usually, the rotating screw first moves the melting resin forward and then is itself forced backward by the accumulated melt until the volume of melt required for an injection shot has accumulated in front of the tip of the screw. Then the screw normally stops turning, rapidly moves forward, and ramlike, pushes the melt through the nozzle into the mold.

SUMMARY OF THE INVENTION

A process has now been found that achieves the marble effect, preferably in a single injection process, and the cats eye glass marble effect, preferably in a co-injection process, using reciprocating screw injection molding machines.

The single injection process comprises injection molding in a salt and pepper blend of ionomer and nylon in a single injection machine, that is an injection molding machine characterized as one having a single barrel through which resin is shot into the nozzle feeding the sprues and gates into the mold.

The co-injection process comprises injection molding the ionomer and nylon in a co-injection machine, that is an injection molding machine characterized as one having more than one barrel, preferably two, through which resin is shot into the nozzle feeding the sprues and gates into the mold. The co-injection process differs from the single injection process in blend on the ionomer and nylon is not made. Instead, the desired quantity of ionomer is introduced through one barrel into the nozzle and the desired quantity of nylon is then introduced through another barrel into the nozzle prior to being fed to the sprues and gates into the mold.

The selection of the ionomer, the nylon, and additives such as colorants as well as the conditions employed in the injection process are important for achieving the desired effects.

The ionomer may be selected from copolymers of ethylene and $\alpha$, $\beta$-ethylenically-unsaturated $C_3$–$C_8$ carboxylic acid (preferably acrylic acid or methacrylic acid) partially neutralized with monovalent and/or bivalent metal cations, preferably sodium, lithium, or magnesium, more preferably sodium.

The nylon must be carefully selected so that at processing temperature it will flow but not disperse well in the ionomer. Theoretically, one could accomplish this by controlling the viscosities of the materials by selecting a nylon having a higher melting point than the ionomer and operating at a processing temperature above that of the ionomer melting point but just below that of the nylon. If one operates too far above the melting point of the ionomer, however, degradation of the ionomer will occur. Therefore, the nylon should be one that has a softening point that is not significantly higher than that of the ionomer particularly if non-yellowed, optically clear ionomer is desired.

The ionomer may be clear or tinted if a background color is desired. The nylon likewise may be colored, preferably with a colorant that differs from that used in the ionomer.

Semicrystalline polyamides, particularly polyepsiloncaprolactam (nylon-6) which has a melting point close to that of the ionomer, can be used. Amorphous polyamides, particularly those blended with ethylene vinyl alcohol available from E. I. du Pont de Nemours and Company under the tradename SELAR®PA, are preferred since they soften but do not melt at temperatures close to that of the ionomer.

Tighter operating conditions are needed with nylon 6, which has a relatively sharp melting point of 205° C. If the ionomer/nylon blend is melt extruded above the nylon melting point that the nylon will become quite fluid and disperse too well in the ionomer resulting in no marble effect. At temperatures less than 200° C., unmelted, not esthetically pleasing, nylon could be seen in the part. At 205° C., large swirls of color, close to those of a natural marble, result. Additionally, gate size and location are critical. With amorphous nylon a much broader processing window exists.

DETAILED DESCRIPTION OF THE INVENTION

The single injection process of the present invention comprises first making a salt and pepper blend of a nylon/colorant master batch and an ionomer, which can optionally also be blended with colorant, preferably different from that used in the nylon/colorant master batch. The salt and pepper blend is then injection molded using a reciprocating screw injection machine, preferably one having a single barrel, under conditions that maintain the nylon/colorant master batch in a state wherein it will flow but will have a viscosity greater than the ionomer so that it will not disperse well in the ionomer at the temperature of injection. The barrel feeds a nozzle which in turn feeds one or more sprues and, in turn, gates in the mold. The gates are positioned so to impinge on the wall of the cavity or the core in the cavity.

The co-injection process of the present invention comprises first feeding the ionomer through one or more than one barrel connected to a nozzle followed closely by feeding the nylon/colorant blend through another barrel connected to the same nozzle. For each additional component desired (for example, another nylon/colorant), another barrel can be used. As in the case of the single injection process, the reciprocating screw injection machine should be operated under conditions that maintain the nylon/colorant master batch in a state wherein it will flow but will have a viscosity greater than the ionomer so that it will not disperse well in the ionomer at the temperature of injection. The barrels feed a nozzle which in turn feeds one or more sprues and, in turn, gates in the mold. The gates are positioned so to impinge on the wall of the cavity or the core in the cavity.

The temperature in each case should be close to the melting point of the ionomer to avoid discoloration that comes if too high a temperature is used and residence time in the extruder should be kept short for production economies and to avoid prolonged exposure to elevated temperatures that will degrade the ionomer. For semicrystalline nylons, tight control of operating conditions is needed. The temperature of process must be controlled above the melting point of the ionomer and no higher than the melting point of the nylon but no lower than a temperature about 5° C. below the melting point of the nylon. One skilled in the art will be able to select an operating temperature based on the teachings herein to assure that the semicrystalline nylon flows (does not have unmelted, non-esthetically pleasing pieces in the finished piece) but is not so fluid that it fully disperses in the ionomer. For nylon 6, the temperature should be greater than 200° C. but less than 205° C., more preferably from about 203° C. to about 205° C.

For amorphous nylon, the temperature range that can be employed is much broader, however, since the amorphous nylon has a softening point and not a sharp melting point. The temperature should be sufficiently high to melt the ionomer and soften the nylon. The temperature should also be close to the melting point of the ionomer and the residence time in the extruder should be kept short for production economies and to avoid prolonged exposure to elevated temperatures that will degrade the ionomer. Preferred operating temperatures are about 350° F. to about 480° F.

The injection machine should be operated in a manner that minimizes mixing of the nylon/colorant master batch and the ionomer, that is the screw should be operated at a slow screw speed, albeit one that is high enough to assure that the screw can fully return to its starting position in time for enough resin for each subsequent shot. Preferably screw speeds of about 20 to 25 revolutions per minute should be used. The extruder should preferably be operated with the shot size being close to maximum so that the material in front of the screw does not experience repeated mixing with each screw rotation. Back pressure on the extruder should be low, preferably no more than 25 pounds per square inch.

The gate through which the material is injected into the mold should be small and positioned so that the injected material impinges of the cavity wall or core of the mold. For semicrystalline nylon, the gate size must be very small, preferably 0.020 to about 0.050 inches in diameter, more preferably 0.020 to about 0.040 inches. For amorphous nylon, the gate size is not critical and can preferably be from about 0.020 to about 0.100 inches in diameter, preferably about 0.020 to about 0.050 inches.

About 0.5 to about 40 weight percent nylon/colorant master batch based on weight of the ionomer can be used. Preferably the nylon/colorant master batch is about 1 to 5 weight percent of the ionomer for best clarity and good swirl pattern. As the percent nylon is increased, clarity decreases. At about 30 to about 40 weight percent, excellent swirl pattern can be achieved, but the clarity is low.

The components of the present invention are as follows:

Nylon

Semicrystalline polyamides can be used in the present invention.

Preferably they should have a sufficiently low (close to that of the ionomer) melting point. The term "semicrystalline polyamide" is well known to those skilled in the art. Semicrystalline polyamides suitable for this invention are generally prepared from lactams or amino acids or from condensation of diamines such as hexamethylene diamine with dibasic acids such as sebacic acid. Copolymers and terpolymers of these polyamides are also included. Polyepsiloncaprolactam (nylon-6) is particularly preferred because of its low melting point, about 205° C.

Amorphous polyamides can be substituted for some or all of the semicrystalline polyamide. The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute.

Examples of the amorphous polyamides that can be used include those amorphous polymers prepared from the following diamines: hexamethylenediamine, 2-methylpentamethylenediamine, 2,2,4-trimethylhexamethylenediamine, 2,4,4-trimethylhexamethyl, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine.

Examples of polyamides that can be used include those amorphous polymers prepared from the following diacarboxylic acids: isophthalic acid, terephthalic acid, alkyl substituted iso- and terephthalic acid, adipic acid, sebacic acid, butane dicarboxylic acid, and the like.

Specific examples of amorphous polyamides which are suitable for this invention include: hexamethylenediamine isophthalamide, hexamethylenediamine isophthalamide/terephthalamide terpolymer, having iso/-terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediame with iso-or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer.

The above amorphous polyamides may contain as comonomers minor amounts of lactam species such as caprolactam or lauryl lactam, even though polymers based on these monomers alone are not amorphous. The important feature is that the polyamide as a whole must be amorphous. Thus small amounts of these comonomers may be incorporated as long as they do not impart crystallinity to the polyamide. In addition, up to about 10 weight % of a liquid or solid plasticizer such as glycerol, sorbitol, mannitol, or aromatic sulfonamide compounds (such as "Santicizer 8" from Monsanto) may be included with the amorphous polyamide.

Preferably the amorphous polyamide is a blend of ethylene vinyl alcohol and amorphous nylon available from E. I. du Pont de Nemours and Company under the tradename SELAR®PA. The polyamide component comprises about 5 to about 95 percent by weight of the total composition of EVOH plus polyamide, preferably about 15 to about 70 percent, and most preferably about 15 to about 30 percent.

Ionomer

The copolymers of ethylene and α,β-ethylenically-unsaturated $C_3$–$C_8$ carboxylic acid ("ethylene-acid copolymers") used to copolymer of this invention have the acid moiety present in an amount of 10 to about 25, (preferably 12 to16 or preferably 19 to 22) wt. % of the copolymer. The preferred acid moieties are methacrylic acid and acrylic acid.

The ethylene-acid copolymers used to make the ionomeric copolymer can also be E/X/Y copolymers where E is ethylene; X is a softening comonomer and Y is the α,β-ethylenically-unsaturated $C_3$–$C_8$ carboxylic acid, particularly acrylic or methacrylic acid. By "softening", it is meant that the polymer is made less crystalline. Suitable "softening comonomers (X) are monomers selected from alkyl acrylate, and alkyl methacrylate, wherein the alkyl groups have from 1–12 carbon atoms which, when present, may be up to 25 (preferably up to 15, most preferably up to 10) wt. % of the ethylene-acid copolymer.

Specific ethylene-acid copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/ methacrylic acid/methyl methacrylate, and ethylene/acrylic acid/n-butyl methacrylate.

The acid moiety is partially neutralized with monovalent and/or bivalent metal cations such as lithium*, sodium*, potassium, magnesium, calcium, barium, lead, tin, zinc or aluminum (*=preferred), or a combination of such cations. The mole percent of acid neutralized is up to about 70%, preferably 30 to 50%.

Ionomers can be made by processes well known in the art (see U.S. Pat. No. 3,262,272 to Rees, for example, which is incorporated herein by reference).

Method of Preparing Master Batches

Colorants are blended with the nylon or ionomer, as the case may be, using known technology for obtaining good mixing. A twin screw extruder, for example, is a preferred melt mixing device. The color added preferably is about 1 to about 4 weight percent of the nylon or ionomer. Preferably the color added is a pigment that is non-bleeding, that is once it has been fully compounded with one component, it will not bleed into the other when the nylon and ionomer are melt blended during the injection molding process.

EXAMPLE

Examples 1

A nylon 6/colorant master batch produced on a lab extruder at Plasti-Couleur, a French MB supplier. A white pigment (0.25 weight percent) and a black pigment (0.25 weight percent) were used to make the master batch.

In order to achieve the marble effect, SURLYN® ionomer PC 100, a sodium neutralized 15% methacrylic acid ionomer available from E. I. du Pont de Nemours and Company mixed with 0.05 weight percent BASF "Sicoversal 23074 (wax based) was used.

The nylon and ionomer components were mixed and fed to a desk clock body tool having a sub-marine pin point gate located mid height of the clock back side placed on a Nestal 150 tons clamping molding machine, with a standard Nestal screw having a diameter of 40 mm. The resulting molded piece had a white marble appearance.

Examples 2

Nylon master batch samples were made in a 30 mm twin screw extruder with 1% by weight of White Pearl color concentrate in the nylon. The master batches were tumble blended with Surlyn® PC-100 at master batch levels of 0.5% to 40% into a salt and pepper blend and then injection molded using a 200 ton Van Doren, 4 zone, 21/1 L/D, 8 ounce, 1½" diameter general purpose screw having a 3 ½ to 1 compression ratio operated at the conditions indicated below. A small pin gate (0.032") was used. The mold produced flex bars (5"×½"×¼").

MASTER BATCH SAMPLE A

Contains—BASF Ultramid-B3 (Nylon 6) and color concentrate-White Pearl (Product #93,553CN) by Teknor Color Co. at 1% by weight.
Barrel Temperatures—Rear 350°–410°–400°–390° F.
Nozzle
Mold Temperature—70° F.
1st Stage Pressure—1600 psi
1st Stage Time—10 seconds
2nd Stage Pressure—1200 psi
2nd Stage Time—5 seconds
Back Pressure—40 psi
Screw RPM—30
Shot Size—Maximum From the samples produced for Sample A, it was critical with this sample to keep the melt temperature at 410° to 415° F. This material needs to be kept below the melt point of the Nylon-6 resin. Nylon-6 should not be well-mixed with Surlyn® PC-100 so as to not diminish the swirl effect within the part. The swirl effect is not on the surface, but it appears deeper inside of the part.

MASTER BATCH SAMPLE B

Contains—Selar® PA 3426 (Amorphous Nylon) and color concentrates—White Pearl (Product #93,553CN) by Teknor Color Co. at 1% by weight.

MASTER BATCH SAMPLE C

Contains—Selar® PA 3508 (Amorphous Nylon) and color concentrates—White Pearl (Product 993,553CN) by Teknor Color Co. at 1% by weight. Barrel Temperatures—
Rear 320°–330°–330°–330° F.
Nozzle
Mold Temperature—70° F.
1st Stage Pressure—1600 psi
1st Stage Time—10 seconds
2nd Stage Pressure—1200 psi
2nd Stage Time—5 seconds
Back Pressure—50 psi Screw RPM—34

Shot Size—Maximum

Both samples were processed with the same injection molding set up. Both samples had a whiter appearance than Sample A. Also there were more swirls on the surface of the part, which gives this material a totally different look.

We claim:

1. A process for marbleizing an ionomer employing a reciprocating screw injection machine comprising feeding a salt and pepper blend of a nylon/colorant master batch and an ionomer, the nylon being a semicrystalline nylon, an amorphous nylon, or a blend of semicrystalline and amorphous nylon, to a reciprocating screw injection machine having a single barrel feeding through a nozzle one or more small gates in a mold having a mold cavity the size of the gates when the nylon is semicrystalline being from about 0.020 to about 0.050 inches in diameter, the one or more gates in the mold being positioned so that material injected through the gate into the mold impinges on a wall of the mold cavity or a core in the mold cavity, the process being operated at a temperature sufficiently high to melt the ionomer, sufficiently high to maintain the nylon/colorant master batch in a state wherein it will flow, but sufficiently low to maintain the viscosity of the nylon at a level greater than that of the melted ionomer so that it will not disperse well in the ionomer at the temperature of injection, the reciprocating screw injection machine being operated in a manner that minimizes mixing of the nylon/colorant with the ionomer prior to exiting the barrel, and the nylon/colorant and ionomer being injected through the one or more gates into the mold cavity in a manner that causes the injected material to impinge on a wall of the mold cavity or the core in the mold cavity.

2. A co-injection process for marbleizing an ionomer with a nylon/colorant master batch, the nylon being a semicrystalline nylon, an amorphous nylon, or a blend of semicrystalline and amorphous nylon, employing a reciprocating screw injection machine having more than one barrel feeding through the same nozzle one or more small gates in a mold having a mold cavity, the size of the gates when the nylon is semicrystalline being from about 0.020 to about 0.050 inches in diameter, the one or more gates in the mold being positioned so that the nylon/colorant and ionomer injected through the gate into the mold impinges on a wall of the mold cavity or a core in the mold cavity comprising feeding ionomer through a first barrel connected to a nozzle followed closely by feeding the nylon/colorant blend through a second barrel connected to the same nozzle of the reciprocating screw injection machine operated at a temperature sufficiently high to melt the ionomer, sufficiently high to maintain the nylon/colorant master batch in a state wherein it will flow but sufficiently low to maintain the viscosity of the nylon at a level greater than that of the melted ionomer so that it will not disperse well in the ionomer at the temperature of injection, the nylon/colorant and the ionomer being injected through one or more gate into the mold cavity in a manner that causes the injected nylon/colorant and the ionomer to impinge on a wall of the mold cavity or the core in the mold cavity.

3. The process of claim 1 or 2 wherein the nylon is an amorphous polyamide.

4. The process of claim 1 or 2 wherein the nylon is nylon 6 and the temperature is less than 205° C.

* * * * *